(12) United States Patent
Nicholson et al.

(10) Patent No.: US 8,162,323 B2
(45) Date of Patent: Apr. 24, 2012

(54) LEAF SEAL ARRANGEMENT

(75) Inventors: Richard Nicholson, Derby (GB); Terence Valentine Jones, Oxford (GB)

(73) Assignee: Rolls-Royce PLC, London (GB)

( * ) Notice: Subject to any disclaimer, the term of this patent is extended or adjusted under 35 U.S.C. 154(b) by 714 days.

(21) Appl. No.: 12/259,934

(22) Filed: Oct. 28, 2008

(65) Prior Publication Data

US 2010/0025936 A1    Feb. 4, 2010

Related U.S. Application Data

(63) Continuation of application No. 11/632,453, filed as application No. PCT/GB2005/002647 on Jul. 6, 2005, now abandoned.

(30) Foreign Application Priority Data

Aug. 7, 2004 (GB) .................................. 0417613.7

(51) Int. Cl.
*F16J 15/447* (2006.01)
(52) U.S. Cl. .................. 277/412; 277/355; 277/417
(58) Field of Classification Search .................. 277/355, 277/412, 417, 418
See application file for complete search history.

(56) References Cited

U.S. PATENT DOCUMENTS

| | | | |
|---|---|---|---|
| 5,524,846 A | 6/1996 | Shine et al. | |
| 6,196,550 B1 | 3/2001 | Arora et al. | |
| 6,267,381 B1 | 7/2001 | Wright | |
| 6,343,792 B1 | 2/2002 | Shinohara et al. | |
| 6,644,667 B2 | 11/2003 | Grondahl | |
| 6,742,782 B2 | 6/2004 | Beichl | |
| 6,808,179 B1 | 10/2004 | Bhattacharyya et al. | |
| 6,811,154 B2 | 11/2004 | Proctor et al. | |
| 7,066,468 B2 | 6/2006 | Uehara et al. | |
| 7,226,053 B2 | 6/2007 | Nakano et al. | |
| 7,651,101 B2 * | 1/2010 | Awtar et al. ................... | 277/412 |
| 2002/0105146 A1 | 8/2002 | Uehara et al. | |
| 2003/0071423 A1 | 4/2003 | Urlichs | |
| 2004/0150165 A1 | 8/2004 | Grondahl | |
| 2008/0048399 A1 * | 2/2008 | Nicholson et al. ............. | 277/355 |
| 2008/0309018 A1 * | 12/2008 | Williams ....................... | 277/411 |
| 2009/0309311 A1 * | 12/2009 | Verma et al. ................... | 277/411 |
| 2009/0322035 A1 * | 12/2009 | Wright ............................ | 277/431 |
| 2010/0025936 A1 * | 2/2010 | Nicholson et al. ............. | 277/411 |

FOREIGN PATENT DOCUMENTS

| | | |
|---|---|---|
| EP | 0 933 567 A2 | 8/1999 |
| EP | 1 231 416 A | 8/2002 |
| FR | 2 496 216 | 6/1982 |
| JP | 2004-162569 A | 6/2004 |
| WO | WO 00/03164 A | 1/2000 |

OTHER PUBLICATIONS

Partial English-language translation of Japanese Office Action from Japanese Application No. 2007-525332, dated Jul. 2, 2010.

* cited by examiner

*Primary Examiner* — Alison Pickard
(74) *Attorney, Agent, or Firm* — Oliff & Berridge, PLC

(57) ABSTRACT

A leaf seal arrangement is provided in which within a housing there are edge portions to inter associate with non parallel chamfer edges in leaf seal elements. In such circumstances, deflection of the leaf seal elements in an outward direction or inward direction relative to a rotating shaft creates variation in a control gap X, XX between the edges and the chamfer edge. Such increase or decrease in the control gap X, XX adjusts the aerodynamic radial force that is presented to the leaf seal elements whereby those elements can be more accurately maintained at a desired leaf position for optimizing leakage while achieving better wear resistance performance.

9 Claims, 4 Drawing Sheets

LEAF SEAL ARRANGEMENT

The present application is a continuation application of application Ser. No. 11/632,453 filed Feb. 7, 2007, which is a U.S. National Stage Application of PCT/GB2005/002647, filed Jul. 6, 2005, which claims priority from Great Britain Application No. 0417613.7, filed Aug. 7, 2004. The disclosure of each of the prior applications is hereby incorporated by reference in its entirety.

The present invention relates to leaf seal arrangements and more particularly to such leaf seal arrangements utilised with regard to rotating shafts.

It will be understood that there are a number of situations where it is necessary to provide a seal dividing regions either side of a shaft. Nevertheless, these shafts may be subject to eccentricities during their rotation and so traditionally labyrinth or brush seals have been utilised. Brush seals typically comprise a depth of bristles projected towards the shaft in order to create a barrier across the seal arrangement. Clearly, it will be appreciated that the tips of these bristles are subject to wear, particularly if through use of a backing plate or high pressure differentials these bristles are "locked" down into engagement with the shaft.

More recently leaf seals have been designed to overcome premature wear and reduced operational life of brush seals. These leaf seals comprise substituting metal leaves for the bristles of the brush seal arrangement described above. A depth of leaves in the axial direction are provided which are compliant in the radial direction but stiff in the axial direction. Stiffness in the axial direction removes the necessity for a supporting backing ring and therefore any tendency for the leaf seal element to lock in position as differential pressure is applied across the seal arrangement. It is the locking of the seal elements in position which causes most contact wear between the shaft and edges of the seal leaves.

A conventional leaf seal eliminates the axial bending issues associated with brush seals by virtue of the inherent axial stiffness of a leaf compared with a single bristle. The method of stacking leaves together will create voids between leaves that will become leakage paths; so front and rear plates are employed to limit this flow. It is observed that the positioning of these plates can alter basic leaf behaviour: a close front plate or a close radial clearance front plate will promote an up-lift blow up force on the leaf, whereas a closer rear plate or closer radial clearance rear plate will promote a downward blow down force on the leaf. Conventionally, the geometry will be defined to promote one or other fundamental characteristic and increased leakage will result from a fundamentally blow-up design arrangement, and increased wear from a fundamentally blow down arrangement.

Ideally, the leaf edges adjacent the shaft will be presented with a slight air gap therebetween such that these leaves essentially ride on the air leakage through that gap to inhibit premature contact wear of the leaf seal elements upon the rotating shaft. It will be understood that the air gap must be as narrow as possible such that air leakage is the minimum necessary to create such air riding effect but limiting actual leakage across the seal. It will be appreciated that typically a number of leaf seal arrangements will be provided in adjacent positions along the axial length of the shaft to further limit through their depth leakage across the combined assembly. Nevertheless, close proximity between the leaf seal element edges and the shaft increases the possibility of contact and therefore wear.

It would be an advantage if the seal can be arranged to change behaviour to suit different operating conditions.

In accordance with the present invention there is provided a leaf seal arrangement comprising leaf seal elements projected within a housing, at least some of the leaf seal elements having an edge chamfer and the housing having an edge portion associated with the edge chamfer whereby, in use, deflection of the leaf seals varies any control gap between the edge chamfers and the edge portion to vary the resistance by the leaf seal element to deflection.

Typically, the leaf seal elements project radially within the housing.

Normally all the leaf seal elements have the same chamfer edge whereby opposite sides of the leaf seal are not parallel with one another. Generally, the edge chamfer is a straight inward truncation or outward slope from the leaf seal.

Generally, the edge portion of the housing comprises an inward bulbous foot directed towards the edge chamfer.

Normally, the leaf seal elements are angularly presented within the housing in use towards a rotating shaft. Generally, the edge portion is normally arranged in use to be at a high pressure side of the arrangement.

Further in accordance with the present invention there is provided a leaf seal combination comprising a plurality of leaf seal arrangements as described above.

Additionally in accordance with the present invention there is provided an engine incorporating a leaf seal arrangement and/or a leaf seal combination as described above.

Embodiments of the present invention will now be described by way of example and with reference to the accompanying drawings in which FIG. 1 is a schematic part cross-section of a conventional leaf seal arrangement in the direction of a shaft axis;

The present invention defines an arrangement that will change the blow up or blow down behaviour based on leaf position. For example, it may be advantageous to define a seal initially in "blow up" configuration to accommodate the increased shaft diameter (caused for example by centrifugal growth) that accompanies increased pressure difference. However, it is often desirous to limit the blow up characteristic, and even to cause some blow down to then promote less leakage at the changed operating condition. This can be accomplished by so profiling the front and or back of the leaf profile to deliver a pre-determined set of controlling clearances at given leaf directions. Simple chamfers, or more complex compound chamfers or curves may be used depending on the forces required for the operation.

Figure 1:
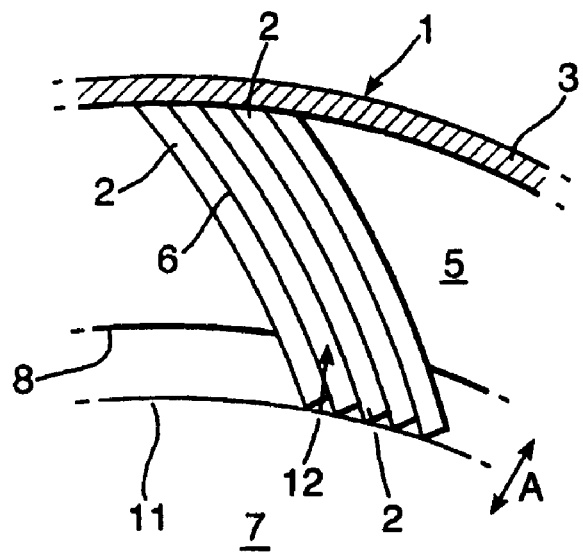
Figure 2:
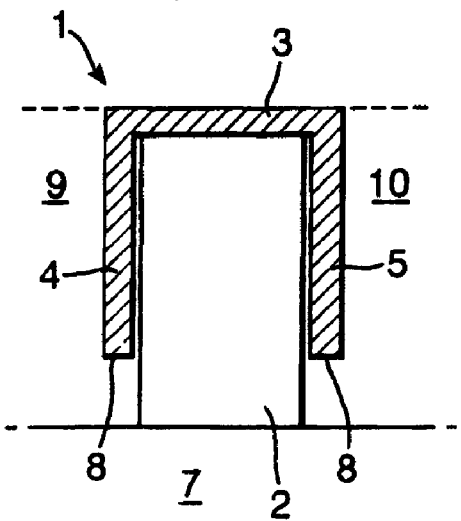
FIG. 2 is a schematic part cross-section of a conventional leaf seal arrangement as depicted in FIG. 1.

Referring to FIGS. 1 and 2 depicting a conventional leaf seal arrangement 1. Thus, the arrangement 1 comprises a number of leaf seal elements 2 secured within a housing 3 which has side plates 4, 5 to constrain and present the leaf seal elements 2. It will be understood there are elements 2 about the whole circumference of the housing projecting towards a shaft 7. The elements 2 are stacked such that small nearly regular triangular gaps 6 are formed towards an outer seal diameter of the leaves 2. Without further additional features these gaps 6 represent leakage pathways across the seal arrangement 1. The side plates 4, 5 are provided in order to restrict flow into and out of the packed assembly of leaf seal elements 2 side-by-side in the housing 3.

As can be seen the leaves 2 project towards the rotating shaft 7 at an angled configuration which is substantially inwardly radial such that the leaf seal elements 2 in contact with the surface of the rotating shaft 7 are positioned to minimise leakage. The inner diameter 8 of the side plates 4, 5 is chosen such that the available inlet area is minimised. The gap between the inner diameter 8 of the side plates 4, 5 to the rotating shaft 7 is limited but is maintained such that there is adequate axial clearance for shaft 7 rotational eccentricities.

The leaf seal elements 2 are subjected to leaf forces which tend to raise (blow up) or lower (blow down) the elements 2 into engagement with the shaft 7. These leaf forces are generated by the choice of clearances, the operational sealing pressure drop across the seal arrangement 1 from an upstream side 9 to a downstream side 10 and the rotational speed of the shaft 7. As indicated previously, a particular problem relates to excessive downward pressure by the leaf seal elements 2 upon the shaft 7 whereby there is premature wearing of those leaf seal elements 2 and therefore degradation in seal arrangement 1 performance.

It will be understood that the rotating shaft may be subject to a number of rotational eccentricities which may displace the relative position of a contact surface 11 in the direction of arrowheads A. Such displacement will place pressure upon the leaf seal elements 2 causing flexing to accommodate these displacements. Flexing of the leaf seal elements 2 will generally cause leakage in the area 12 between leaf seal elements 2, but nevertheless due to the constraint of the side plates 4, 5, this leakage will be constricted and may force locked engagement between the ends of the leaf seal elements 2 and the surface 11 causing greater wear between these elements 2 and that surface 11. Nevertheless, through greater control of this leakage it is desirable in accordance with the present invention, utilising the below described embodiments, to achieve more controlled deformation and deflection of the leaf seal elements whereby close but spaced positioning is maintained between the ends of leaf seal elements and the surface of a rotating shaft. In such circumstances, seal efficiency will be maintained but with reduced wear upon the edges of the seal elements adjacent the rotating shaft surface.

Figure 3:
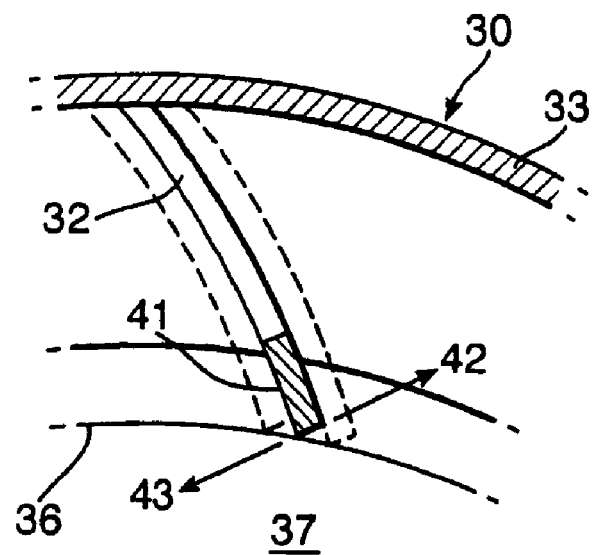
FIG. 3 is a schematic part cross-section of a first embodiment of a leaf seal arrangement depicted in the direction of a rotating shaft.
Figure 4:
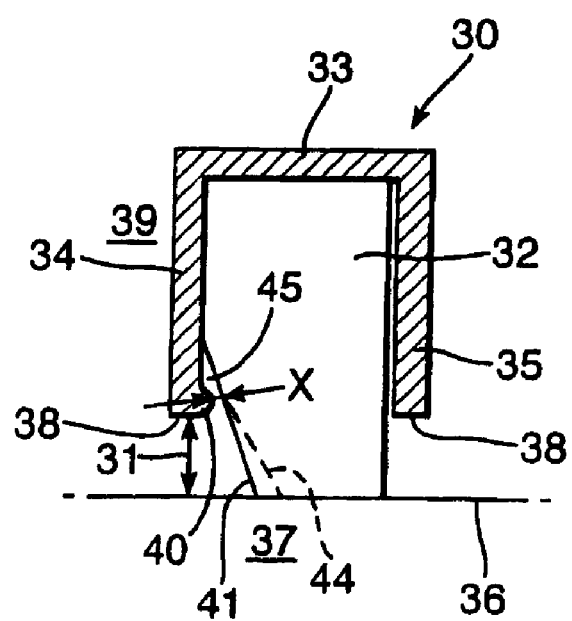
FIG. 4 is a schematic part cross-section of the first embodiment of a leaf seal arrangement depicted in FIG. 3.

FIGS. 3 and 4 illustrate a first embodiment of a leaf seal arrangement in accordance with the present invention. Thus, the arrangement 30 comprises a number of leaf seal elements 32 presented as previously at an angular radial projection towards a rotating shaft 37 within a housing 33. The housing 33 comprises side plates 34, 35 to constrain and present the leaf seal elements 32 towards the rotating shaft 37. As previously, the housing 33 through the side plates 34, 35 has an inner diameter 38 such that there is a minimum inlet area 31 to accommodate for rotational eccentricities.

Generally, in accordance with the present invention, an upstream side plate 34 of the housing 33 towards the high pressure side 39 has an edge portion 40 which extends axially inward of the housing 33 to engage a chamfer edge 41 of the seal element 32. The leaf seal element 32 is therefore of a non parallel nature. Due to the cut away or truncated nature of the chamfer edge 41 it will be appreciated that as the seal element 32 flexes in a direction 42 then a control gap X increases. An increased control gap X adjusts the presented aerodynamic force and allows the radial force to be adjusted to match the deflection required in terms of eccentric rotation in the shaft 37. Alternatively, the control gap X decreases when there is movement in the direction of arrowhead 43 as the chamfer edge 41 moves towards the edge portion 40. In such circumstances, dependent upon the direction of deflection movement 42, 43, there will be a reciprocal alteration in the radial force in order to provide adjustment to match the deflection required to render the leaf seal element 32 appropriately positioned riding upon an accurate air gap between the end of the leaf seal element 32 and the surface 31 of the rotating shaft 37. The appropriate position will equate to a steady state condition for the arrangement.

Figure 5:
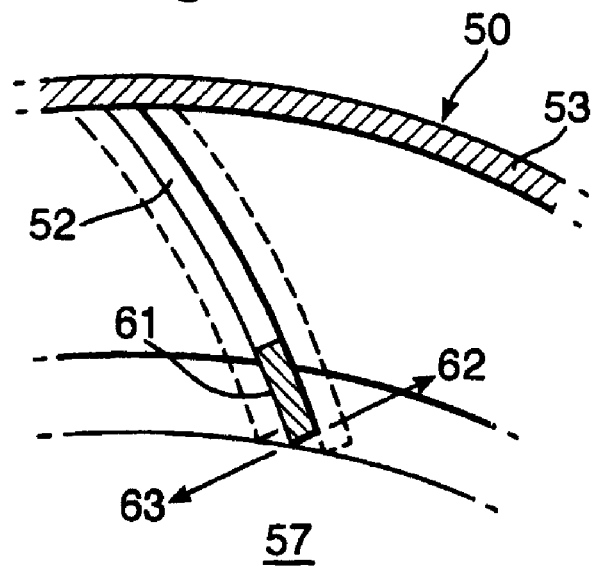
FIG. 5 is a schematic part cross-section of a second embodiment of a leaf seal arrangement depicted in the direction of a rotating shaft.
Figure 6:
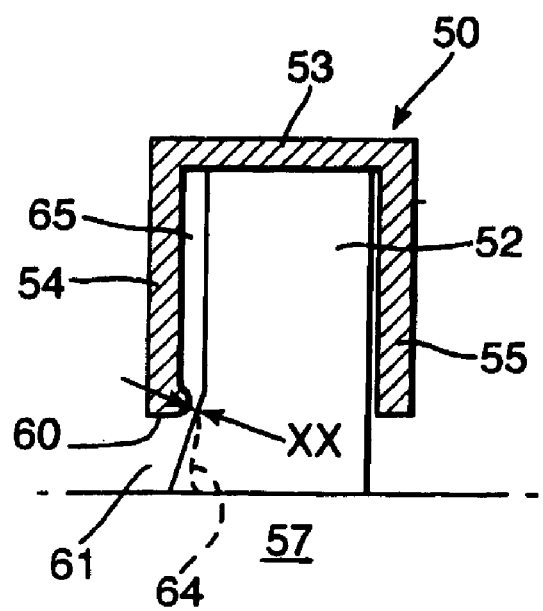
FIG. 6 is a schematic part cross-section of the second embodiment of a leaf seal arrangement depicted in FIG. 5.

FIGS. 5 and 6 illustrate a second embodiment of a leaf seal arrangement 50 in accordance with the present invention. In general the second embodiment provides an outward chamfer edge rather than the inward or cut away chamfer edge 41 depicted in FIGS. 3 and 4. The arrangement 50 again comprises leaf seal elements 52 arranged in an angular radial projection from an housing 53 about a rotating shaft 57. Side plates 54, 55 are provided within which the leaf seal elements 52 are presented. A bulbous edge portion 60 is provided which extends axially inwards of the housing 53 for association with a chamfer edge 61 in order that a control gap XX between that edge 60 and the chamfer edge 61 varies dependent upon deflection of the leaf seal element 52. Thus outward deflection in the direction of arrowhead 62 results in a decreasing control gap XX whilst inward deflection in the direction of arrowhead 63 results in an opening of the control gap XX. As indicated previously, these variations in control gap XX width alter the presented aerodynamic forces and so control element 52 position relative to the shaft.

It is appropriate choice of the bulbous edge portion 40, 60 and opposed chamfer edge 41, 61 that allows control of the control gap X, XX whereby leakage through that control gap X, XX ensures that there is variation in the radial resistive force to deflection, that is to say, susceptibility to blow up or blow down forces. This variation is matched with the deflection required in the leaf seal elements 32, 52 dependent upon rotating shaft 37, 57 eccentricity and/or pressure differentials across the seal arrangement 30, 50. By appropriate choice of edge portion 40, 60 and chamfer edge 41, 61 size and shape the necessary responses and adjustments in radial force can be tuned as required by a particular installation. It will be appreciated that edge portion 40, 60 and chamfer edge 41, 61 could be provided both as illustrated at the upstream leading edge of the seal arrangements 30, 50 and/or at the downstream or trailing edge sides of the arrangements 30, 50, that is to say in the side plates 35, 55. By such an arrangement varying deflection responsivity can be provided to the leaf seal elements 32, 52 whereby there is less lockdown contact, that is to say excessive blow down pressure, between those elements 32, 52 and the shaft 37, 57 with detrimental abrasion leading to premature failure of seal arrangements 30, 50.

The use of edge portions 40, 60 in association with chamfer edges 41, 61 provides a further design choice, in addition to the material type from which the leaf seal elements 32, 52 are made, and their thickness and shaping, in order to achieve a desired sealing efficiency and operational life.

It will be appreciated that the edge portion 40, 60 and chamfer edge 41, 61 relative positioning for non parallel response need not be linear about the shaft 57. Thus, the progress of the control gap X, XX widening or narrowing dependent upon leaf seal element 32, 52 deflection may not provide a uniform unitary alteration in control gap X, XX width with displacement whereby radial force can be varied non uniformly with deflection. In such circumstances, possibly the chamfer edge 40, 41 may have a curved or otherwise recessed shape illustrated by broken lines 44, 64 whereby the variation in the control gap X, XX alters non uniformly with deflection in the direction of arrowheads 42, 43; 62, 63.

Conventionally, it will be appreciated the features on the upstream face (plate 34, 54) of the leaf seal element pack or stack tend to control "blow up" behaviour whilst features in the downstream (side plate 35, 55) tend to control the "blow down" behaviour of the seal arrangement 30, 50. By combining the embodiments depicted in FIGS. 3 and 4 along with FIGS. 5 and 6 into a seal arrangement combination at the inlet and outlet sides of that combination, it is possible to limit the maximum effect of pressure excursions of the leaf seal elements 32, 52 by use of controlling orifices to switch desirable radial force "blow up" behaviour and "blow down" behaviour as required with regard to seal element 32, 52 deflections. Thus, a seal combination can be provided which is more sympathetic to rotating shaft 37, 57 eccentricities. In such circumstances, by enabling variation and adjustment in the radial force it is possible to ensure that the multiplicity of leaf seal elements combined together in a seal pack formed in the housings 33, 53 can retain the desired pre positioned leaf seal element attitude upon the rotating shaft 37, 57 to optimise leakage behaviour and operational life due to lower wear.

The present invention has particular applicability with regard to gas turbine engines used in any application. It will be appreciated that these engines are generally multi shafted with cascades of compressors and turbines which require seal isolation between each stage. In such circumstances leaf seal arrangements provided in appropriate combinations are utilised to provide such stage isolation. Seal arrangements 30, 50 will be combined in a cascade along the axial length of rotating shafts in order to provide the necessary sealing isolation.

By providing the bulbous edge portion 40, 60 associated with the chamfer edge 41, 61 such that the control gap X, XX varies, it will be understood that a pocket 45, 65 is created into which air leaks through the control gap X, XX. It is this gaseous leakage into the pockets 45, 65 which through orifice entry to inter leaf seal element spacings between adjacent such elements 32, 52 creates the desired variation in radial force and therefore deflection response required to more reliably position the leaf seal elements 32, 52 as required. The size of these pockets 45, 65 will again be determined as necessary for appropriate seal arrangement 30, 50 performance both individually and collectively in a seal combination.

Figure 7:
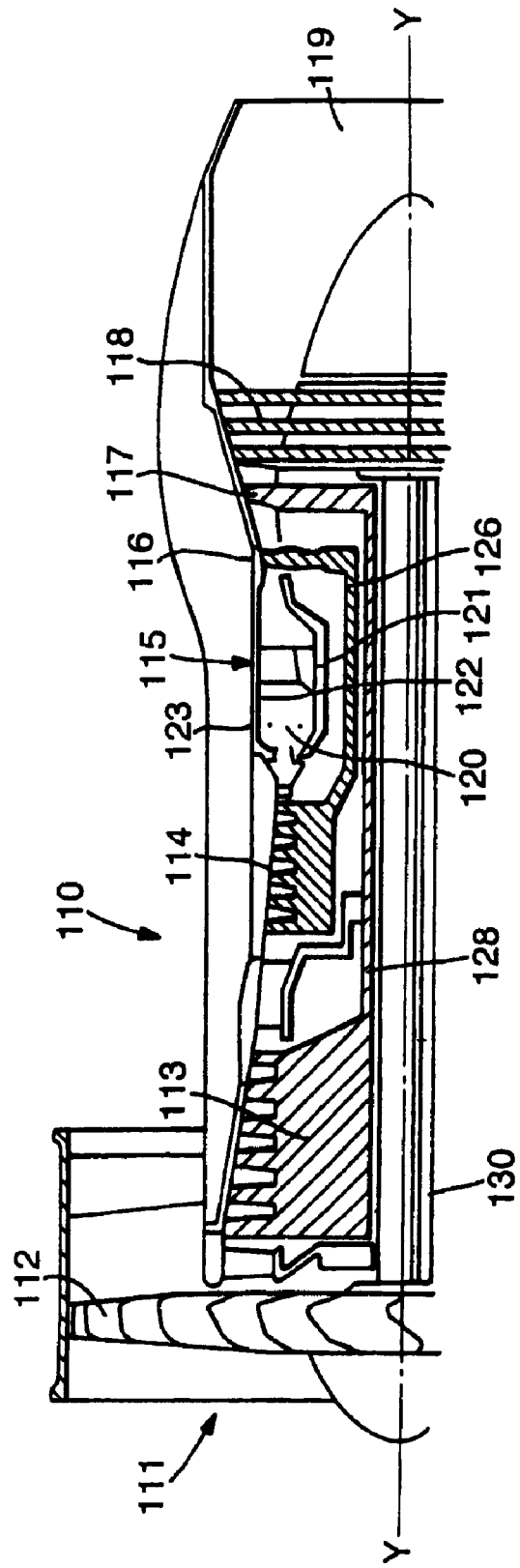
FIG. 7 is a schematic part cross-section of an engine.

Referring to FIG. 7, a gas turbine engine is generally indicated at 110, and comprises, in axial flow series, an air intake 111, a propulsive fan 112, an intermediate pressure compressor 113, a high pressure compressor 114, combustion equipment 115, a high pressure turbine 116, an intermediate pressure turbine 117, a low pressure turbine 118 and an exhaust nozzle 119.

The gas turbine engine 110 works in a conventional manner so that air entering the intake 111 is accelerated by the fan 112 which produces two air flows: a first air flow into the intermediate pressure compressor 113 and a second air flow which provides propulsive thrust. The intermediate pressure compressor comprises the air flow directed into it before delivering that air to the high pressure compressor 114 where further compression takes place.

The compressed air exhausted from the high pressure compressor 114 is directed into the combustion equipment 115 where it is mixed with fuel and the mixture combusted. The resultant hot combustion products then expand through, and thereby drive, the high, intermediate and low pressure turbines 116, 117 and 118 before being exhausted through the nozzle 119 to provide additional propulsive thrust. The high, intermediate and low pressure turbine 116, 117 and 118 respectively drive the high and intermediate pressure compressors 114 and 113, and the fan 112 by suitable interconnecting shafts.

Leaf seal arrangements and combinations in accordance with the present invention can be utilised about the interconnecting shafts in order to isolate and prevent leakage of gases between the compressor stages and turbine stages.

It will be understood that the front and back plates may have features in order to help in defining the radius where the controlling orifice occurs. This feature may be at the innermost diameter, or at some other radial position. The blow up or blow down behaviour can be tailored and optimised for a wider range of operating conditions than is possible with straight-sided leaves. Thus, for a typical seal arrangement in accordance with the present invention there may be movements/control as follows.

For a shaft movement upward into contact, the leaf element edge is moved/pushed up so that with an upstream control edge there is leaf movement away as blow up increases, with a downstream control edge there is greater blow down with higher leaf to shaft force, with a modified downstream control edge blow down increases to a limit so that a desirable/controllable leaf to shaft force increase is achieved but this is limited to possibly ensure 'light load' at greatest shaft movement and finally, with a compound control, that is to say both upstream and downstream control edges, blow up initially increases with initial leaf movement away from the shaft until the downstream edge begins to control with a blow down push into the shaft for a stable position.

For a shaft movement down (away from leaf contact) the leaf itself may move down is that with an upstream control edge blow down increases if leaf element begins to move to follow the shaft otherwise there may be continued blow down, with a downstream control edge blow up increases but if leaf begins to move there is less tendency to blow down and follow shaft eccentricity, similarly with a modified downstream edge control blow up increases with a reduced tendency to blow down if the leaf flows the shaft, with a compound control of both upstream and downstream control edges, initially at a shaft up position the leaf follows the shaft until it attains a desired position when a blow up effect on the leaf element then means a steady state position is attained.

In view of the above, it is possible to provide a seal arrangement for a wider range of expected operating conditions.

The invention claimed is:
1. A leaf seal arrangement for sealing in a sealing direction between an upstream region and a downstream region, the leaf seal arrangement comprising:
   leaf seal elements projecting within a housing comprised of side plates adjacent to upstream and downstream edges of the leaf seal elements, the leaf seal elements being substantially planar and having their main surfaces substantially parallel to the sealing direction,
   wherein at least one of the upstream edge or the downstream edge of each leaf seal element comprises a chamfer, and the corresponding side plate has an edge portion associated with the chamfers of the leaf seal elements,
   wherein the edge portion comprises an inward bulbous foot directed towards the chamfer, and
   wherein, in use, deflection of the leaf seal elements varies a control gap between the chamfers and the edge portion to vary the resistance by the leaf seal element to deflection.

2. An arrangement as claimed in claim 1 wherein the leaf seal elements project radially within the housing.

3. An arrangement as claimed in claim 1 wherein all the leaf seal elements have the same chamfer edge whereby opposite sides of the leaf seal are not parallel with one another.

4. An arrangement as claimed in claim 1, wherein the chamfer is a straight inward truncation or outward slope from the leaf seal element.

5. An arrangement as claimed in claim 1 wherein the leaf seal elements are angularly presented within the housing in use towards a rotating shaft.

6. An arrangement as claimed in claim 1 wherein the edge portion of the housing is normally arranged in use to be at a high pressure side of the arrangement.

7. A leaf seal combination comprising a plurality of leaf seal arrangements as claimed in claim 1.

8. An engine incorporating a leaf seal arrangement as claimed in claim 1.

9. An engine incorporating a leaf seal combination as claimed in claim 8.

* * * * *